H. B. MOLESWORTH.
STEERING HEAD FOR MOTOR DRIVEN ROAD VEHICLES.
APPLICATION FILED AUG. 14, 1919.

1,370,900.                                  Patented Mar. 8, 1921.

INVENTOR:
Henry Bridges Molesworth
By  Wm Wallace White
ATT'Y

UNITED STATES PATENT OFFICE.

HENRY BRIDGES MOLESWORTH, OF BEXLEY, ENGLAND.

STEERING-HEAD FOR MOTOR-DRIVEN ROAD-VEHICLES.

1,370,900.     Specification of Letters Patent.     Patented Mar. 8, 1921.

Original application filed September 12, 1918, Serial No. 253,733. Divided and this application filed August 14, 1919. Serial No. 317,570.

*To all whom it may concern:*

Be it known that I, HENRY BRIDGES MOLESWORTH, a subject of the King of Great Britain, and resident of Bexley, Kent, England, have invented a new and useful Improvement in Steering-Heads for Motor-Driven Road-Vehicles, of which the following is a specification.

My invention relates to improvements in steering heads for motor driven road vehicles by which the steering road wheels of such vehicles are operatively moved through a hand wheel mounted on the chassis, and the object of my improvement is to enable the said vehicles to be driven at the same speeds and with equal facility in both directions of travel and by the same steering operating means, thus obviating the necessity of turning the vehicles when opposite direction of travel is required.

I attain the object of my improvement by the mechanism illustrated in the accompanying drawing, in which:—

The same reference numerals denote the same parts throughout the several figures.

Figure 1:
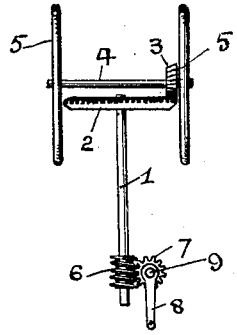
Figure 1 is an elevation of a steering head according to my invention.

Referring to Fig. 1, 1 is the steering shaft supported on the vehicle to which it is fitted by a suitable pillar (not shown), the said shaft having keyed or otherwise rigidly secured thereto the bevel or the like gear wheel 2. Meshing with such gear wheel is a bevel or the like pinion 3 rigidly carried by the shaft 4, the said shaft 4 being suitably supported for rotation on the steering pillar and on the said shaft 4 I provide two hand wheels 5. The lower end of the shaft 1 rigidly carries a worm 6 meshing with a wheel 7 rigid with which is the arm piece 8. The said arm piece 8 is suitably connected to a rod or other convenient means whereby the steering road wheels may be moved for the purpose of steering the vehicle carrying the steering head. The wheel 7 has a rotary movement on a stud 9 secured to the chassis of the vehicle.

Figure 2:
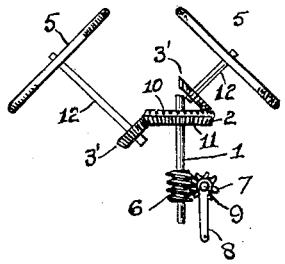
Figs. 2 and 3 are elevations of a steering head according to my invention in modified forms relatively to the construction illustrated by Fig. 1.

When it is desired that the hand wheels 5 shall be in an inclined position I modify the arrangement lastly hereinbefore described as shown in Fig. 2 wherein the wheel 2 is provided with teeth at 10, 11, and each hand wheel is carried by a shaft 12, to each of which shafts is rigidly secured the pinion 3′, which pinions respectively mesh with the wheel 2. The hand wheels 5 (with their shafts) may be supported for rotation on the steering pillar in any suitable and convenient manner.

Figure 3:
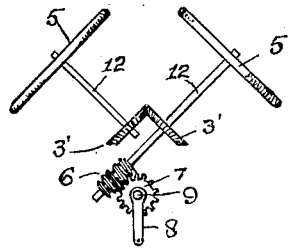

I may modify the steering head as lastly hereinbefore described in the manner illustrated by Fig. 3. Referring to such figure it will be seen that I dispense with the shaft 1 and the wheel 2 and arrange the pinions 3′ on the shafts 12 in mesh with each other, the worm 6 in such case being carried by one of the shafts 12 as shown, such shaft thus operating as the steering shaft.

Instead of the worm 6 and the wheel 7 in all cases I may employ any other suitable means for imparting movement to the rod or the like above referred to for operating the steering road wheels.

The steering pillar is placed in any convenient position on a vehicle, but so that the hand wheels are in the usual direction relatively to the vehicle and a seat for the driver may be arranged at two sides of the steering pillar in a line with the longitudinal axis of the vehicle, or one seat only may be provided and so arranged as to pivot about the steering pillar and thus be capable of being moved from one side of the steering pillar to the other. The driver steers with the hand wheel nearest to him and to proceed in a direction the reverse of that in which he has been traveling he either merely changes from one seat to the other (where two seats are provided) or (when there is but one seat as referred to above) he moves such seat to the opposite side of the steering pillar and steers with the other hand wheel.

It will be understood that the effect of the super-addition of the bevel or like gearing relatively to the steering head is to cause the steering road wheels to be moved in the desired direction whichever hand wheel is operated.

I claim.—

1. A steering head for motor vehicles, comprising a rotatable steering member, a pair of hand wheels supported for rotation at opposite sides of said steering member, and gearing between said hand wheels and steering member for rotating said member from either of said hand wheels, the direction of rotation of said member being the same when the hand wheels are rotated in the same direction.

2. A steering head for motor vehicles, comprising a rotatable steering member, a pair of hand wheels supported for rotation at opposite sides of said steering member, gearing between said hand wheels and steering member for rotating said member from either of said hand wheels, the direction of rotation of said member being the same when the hand wheels are rotated in the same direction, and means carried by said steering member for transmitting motion to the steering mechanism of a vehicle.

3. A steering head for motor vehicles, comprising a vertical shaft mounted for rotation and carrying means for transmitting motion to the steering mechanism of a vehicle, a horizontal shaft mounted for rotation, a pair of hand wheels secured to said horizontal shaft, one at each side of said vertical shaft, and gearing between said shafts for rotating said vertical shaft from either of said hand wheels, the direction of rotation of said shaft being the same when the hand wheels are rotated in the same direction.

Dated 26th June, 1919.

HENRY BRIDGES MOLESWORTH.